US012584614B1

(12) United States Patent
Kanesada et al.

(10) Patent No.: US 12,584,614 B1
(45) Date of Patent: Mar. 24, 2026

(54) ELECTRONIC DEVICE

(71) Applicant: Innolux Corporation, Miaoli County (TW)

(72) Inventors: Shoji Kanesada, Miaoli County (TW); Mitsuru Takano, Miaoli County (TW); Ayumu Mori, Miaoli County (TW); Akihiro Iwatsu, Miaoli County (TW); Shuji Hagino, Miaoli County (TW); Hiroshi Mise, Miaoli County (TW); Makoto Kaneta, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/953,127

(22) Filed: Nov. 20, 2024

(51) Int. Cl.
| | |
|---|---|
| *F21V 21/008* | (2006.01) |
| *F16M 11/04* | (2006.01) |
| *F16M 11/10* | (2006.01) |
| *F16M 13/02* | (2006.01) |
| *F21V 21/14* | (2006.01) |
| *G09F 9/302* | (2006.01) |

(52) U.S. Cl.
CPC ......... *F21V 21/008* (2013.01); *F16M 11/046* (2013.01); *F16M 11/10* (2013.01); *F16M 13/022* (2013.01); *F21V 21/14* (2013.01); *G09F 9/3026* (2013.01)

(58) Field of Classification Search
CPC ..... F16M 11/046; F16M 11/10; F21V 21/008; F21V 21/14
See application file for complete search history.

(56) References Cited

U.S. PATENT DOCUMENTS

| | | | |
|---|---|---|---|
| 11,408,599 B1 * | 8/2022 | Oross | ....................... F21V 21/30 |
| 12,264,806 B1 * | 4/2025 | Yang | ..................... F21V 19/003 |
| 2015/0192262 A1 * | 7/2015 | Champagne | ............ G09F 13/22 40/714 |
| 2022/0074542 A1 * | 3/2022 | Priola | .................. A47B 97/001 |

FOREIGN PATENT DOCUMENTS

| | | | | |
|---|---|---|---|---|
| AT | 16271 U1 * | 5/2019 | ............. | F21V 21/30 |
| CN | 103697433 A * | 4/2014 | | |
| CN | 110260174 A * | 9/2019 | ............. | F21K 9/20 |
| CN | 115362853 A * | 11/2022 | ............. | B65H 75/48 |
| KR | 20140134033 A * | 11/2014 | ............. | F21V 21/16 |

OTHER PUBLICATIONS

KR-20140134033 Translation provided by Google Patents (Year: 2014).*

* cited by examiner

*Primary Examiner* — Zheng Song
(74) *Attorney, Agent, or Firm* — JCIPRNET

(57) ABSTRACT

An electronic device includes at least one electronic unit. Each of the at least one electronic unit includes a first light-emitting device, an adjustment device and a suspension device. The adjustment device is connected to the first light-emitting device for adjusting a position state of the first light-emitting device. The suspension device is connected to the adjustment device.

16 Claims, 17 Drawing Sheets

112 113   114

132

134

131

133

135

Y

Z

X

B

130(E)

T1

T2

T2

140

140

T3

100j

E

E

Z
X
Y

ELECTRONIC DEVICE

BACKGROUND

Technical Field

The present disclosure relates to an electronic device, and particularly relates to an electronic device that can change the position state.

Description of Related Art

The current market demand is for large-size digital electronic devices that can be wall-mounted or fixed/erected on a solid mechanical frame. However, through the above-mentioned installation method, it is not easy to move and/or change the style and size of the electronic device.

SUMMARY

The present disclosure is directed to an electronic device that can change the position state.

According to an embodiment of the present disclosure, the electronic device includes at least one electronic unit. Each of the at least one electronic unit includes a first light-emitting device, an adjustment device and a suspension device. The adjustment device is connected to the first light-emitting device for adjusting a position state of the electronic device. The suspension device is connected to the adjustment device.

Based on the above, in an embodiment of the present disclosure, the adjustment device is connected to the first light-emitting device, and the suspension device is connected to the adjustment device, thereby changing the position state and expanding the application scope of the electronic device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
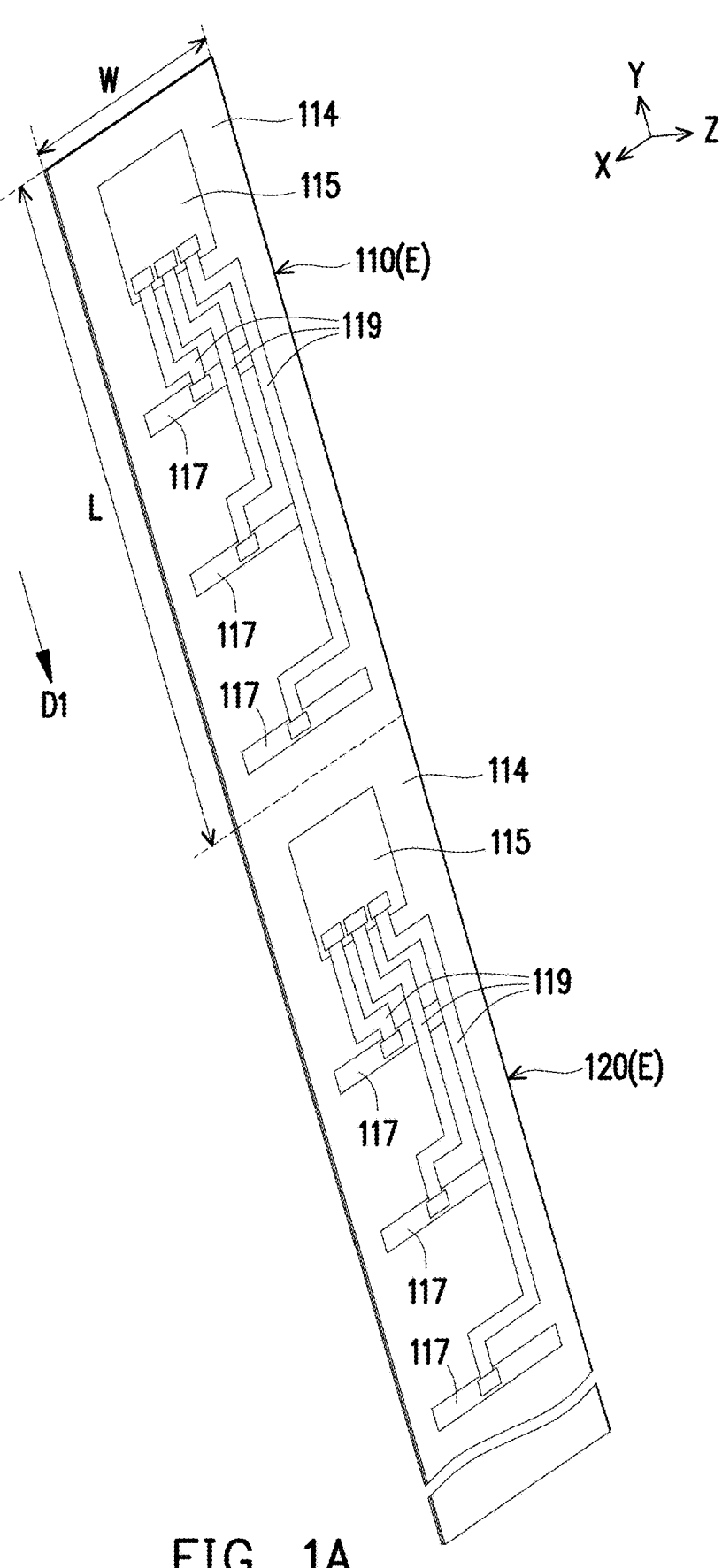
FIG. 1A is a three-dimensional schematic view of a first light-emitting device and a second light-emitting device of an electronic device of an embodiment of the disclosure.

Reference will now be made in detail to exemplary embodiments of the disclosure, examples of which are illustrated in the accompanying drawings. Wherever possible, the same reference numerals are used in the drawings and description to refer to the same or like parts.

The disclosure may be understood with reference to the following detailed description together with the accompanying drawings. It should be noted that, for ease of understanding by readers and conciseness of the drawings, a plurality of drawings in the disclosure merely shows a part of an electronic device, and specific elements in the drawings are not drawn to scale. In addition, the number and size of the elements in the drawings only serve for exemplifying instead of limiting the scope of the disclosure.

Certain terms are used throughout the description and the appended claims to refer to specific elements. Those skilled in the art should understand that electronic device manufacturers may refer to the same element by different names. Herein, it is not intended to distinguish between elements that have the same function but have different names.

In the following description and claims, terms such as "include", "comprise", and "have" are open-ended terms, and thus should be interpreted as "including, but not limited to".

In addition, relative terms, such as "below" or "bottom" and "above" or "top," may be used in the embodiments to describe the relative relationship of one element to another element of the drawings. It will be understandable that if the device in the drawings is turned upside down, elements described on the "lower" side will become elements described on the "upper" side.

In some embodiments of the disclosure, terms related to bonding and connection such as "connection", "interconnection", etc., unless specifically defined, may indicate the case where two structures are in direct contact, or where two structures are not in direct contact and other structures are disposed in between. Moreover, such terms related to bonding and connection may also cover the case where two structures are both movable or where two structures are both fixed. Furthermore, the term "coupling" includes transfer of energy between two structures by means of direct or indirect electrical connection, or transfer of energy between two separate structures by means of mutual induction.

It should be understood that when an element or film layer is referred to as being "on", or "connected to" another element or film layer, the element or film layer may be directly on or connected to another element or film layer, or intervening elements or film layers may also be present in between (non-direct circumstances). In contrast, when an element or film layer is referred to as being "directly on" or "directly connected to" another element or film layer, no intervening elements or film layers are present in between.

The term "about", "equal to", "equivalent" or "same", "substantially", or "essentially" is typically interpreted so that a value is within 20% of a given value or range, or within 10%, 5%, 3%, 2%, 1%, or 0.5% of a given value or range.

In this disclosure, optical microscopy (OM), scanning electron microscope (SEM), thin film thickness profilometer (α-step), ellipsometer, or other suitable methods may be used to measure the area, width, thickness or height of various components, or the distance or pitch between components. Specifically, according to some embodiments, a scanning electron microscope may be used to obtain cross-sectional structure images including the components to be measured, and to measure the area, width, thickness or height of each component, or the distance or pitch between components.

In this disclosure, the definition of roughness determination can be observed by SEM. On an uneven surface, the peak-to-valley distance difference of surface undulations can be seen to be between 0.15 micrometers (μm) and 1 μm. Roughness determination measurements may include using SEM, Transmission electron microscope (TEM), etc., to observe the surface undulation conditions under the same appropriate magnification, and comparing the undulation conditions by taking a sample of unit length (e.g., 10 μm) to determine its roughness range. Here, "appropriate magnification" means that at least one surface can see at least 10 undulation peaks in the field of view at this magnification for the roughness (Rz) or average roughness (Ra).

As used herein, the term(s) "film" and/or "layer" may refer to any continuous or discontinuous structure and material (e.g., materials deposited by the methods disclosed herein). For example, films and/or layers may include two-dimensional materials, three-dimensional materials, nanoparticles, or even partial or complete molecular layers, or partial or complete atomic layers, or atomic and/or molecular clusters. The films or layers may include materials or layers having pinholes and may be at least partially continuous.

Although the terms first, second, third, and so on may be used to describe diverse constituent elements, such constituent elements are not limited by the terms. The terms are used only to discriminate one constituent element from other constituent elements in the description. In the claims, the terms first, second, third, etc. may be used in accordance with the order of claiming elements instead of using the same terms. Accordingly, a first constituent element in the following description may be a second constituent element in the claims.

Unless otherwise defined, all terms (including technical and scientific terms) used herein have the same meaning as commonly understood by one of ordinary skill in the art. It is understandable that these terms, such as those defined in commonly used dictionaries, should be interpreted to have a meaning consistent with the background or context of the related art and the disclosure, and not interpreted in an idealized or overly formal manner, unless specifically defined herein.

It should be noted that features in several different embodiments below may be replaced, recombined, mixed with each other to achieve other embodiments without departing from the spirit of the disclosure.

An electronic device of the disclosure may include a power module, a semiconductor device, a semiconductor packaging device, a display device, an antenna device, a sensing device, a light-emitting device, or a tiling device, but not limited thereto. The electronic device may include a bendable or flexible electronic device. The electronic device may include an electronic element. The electronic element may include a passive element, an active element, or a combination of the above, such as a capacitor, a resistor, an inductor, a variable capacitor, a filter, a diode, a transistor, a sensor, a microelectromechanical system element (MEMS), a liquid-crystal chip, etc., but not limited thereto. The diode may include a light-emitting diode or a non-light-emitting diode. The diode includes a P-N junction diode, a PIN diode, or a constant current diode. The light-emitting diode may include, for example, an organic light-emitting diode (OLED), an inorganic light-emitting diode, for example a mini LED, a micro LED, a quantum dot LED, fluorescence, phosphor, or other suitable materials, or a combination of the above, but not limited thereto. The sensor may include, for example, a capacitive sensor, an optical sensor, an electromagnetic sensor, a fingerprint sensor (FPS), a touch sensor, an antenna, or a pen sensor, but not limited thereto. In the following, the display device is used as the electronic device to illustrate the content of the disclosure, but the disclosure is not limited thereto. According to an embodiment of the disclosure, the provided manufacturing method of the electronic device may be applied, for example, to a wafer-level package (WLP) or a panel-level package (PLP) process, and the chip-first process or the chip-last (RDL-first) process may be adopted, which may be further described in detail below. The electronic device referred to in the disclosure may include a light emitting device, a display device, a sensing device, or a combination of the above, but not limited thereto.

Reference will now be made in detail to exemplary embodiments of the disclosure, examples of which are illustrated in the accompanying drawings. Wherever possible, the same reference numerals are used in the drawings and description to refer to the same or like parts.

Figure 1B:
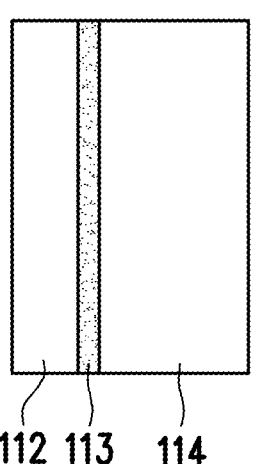
FIG. 1B is a partially enlarged cross-sectional view of the first light-emitting device of the electronic device of FIG. 1A.
Figure 1C:
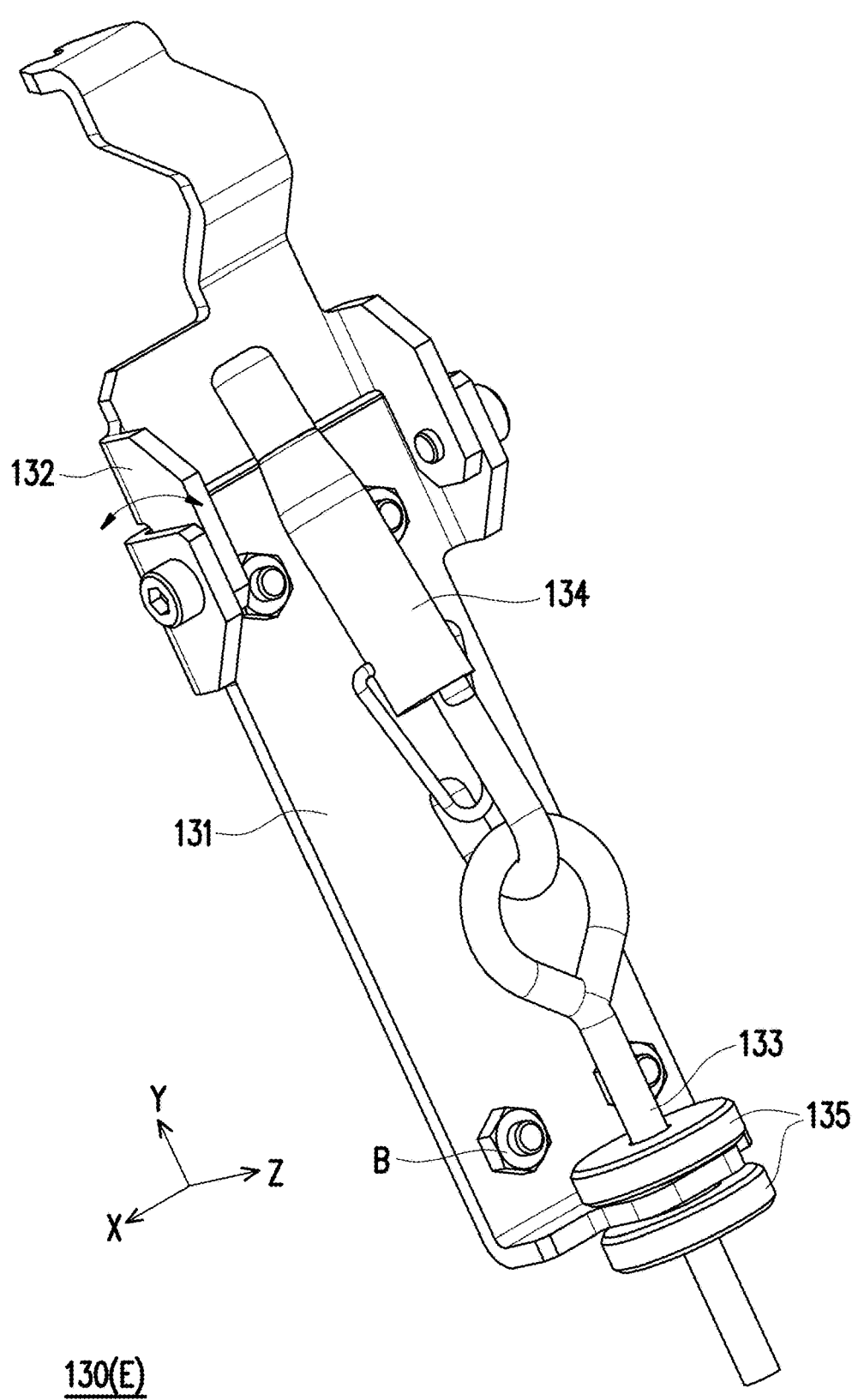
FIG. 1C is a three-dimensional schematic view of an adjustment device and a suspension device of the electronic device of FIG. 1A.
Figure 2:
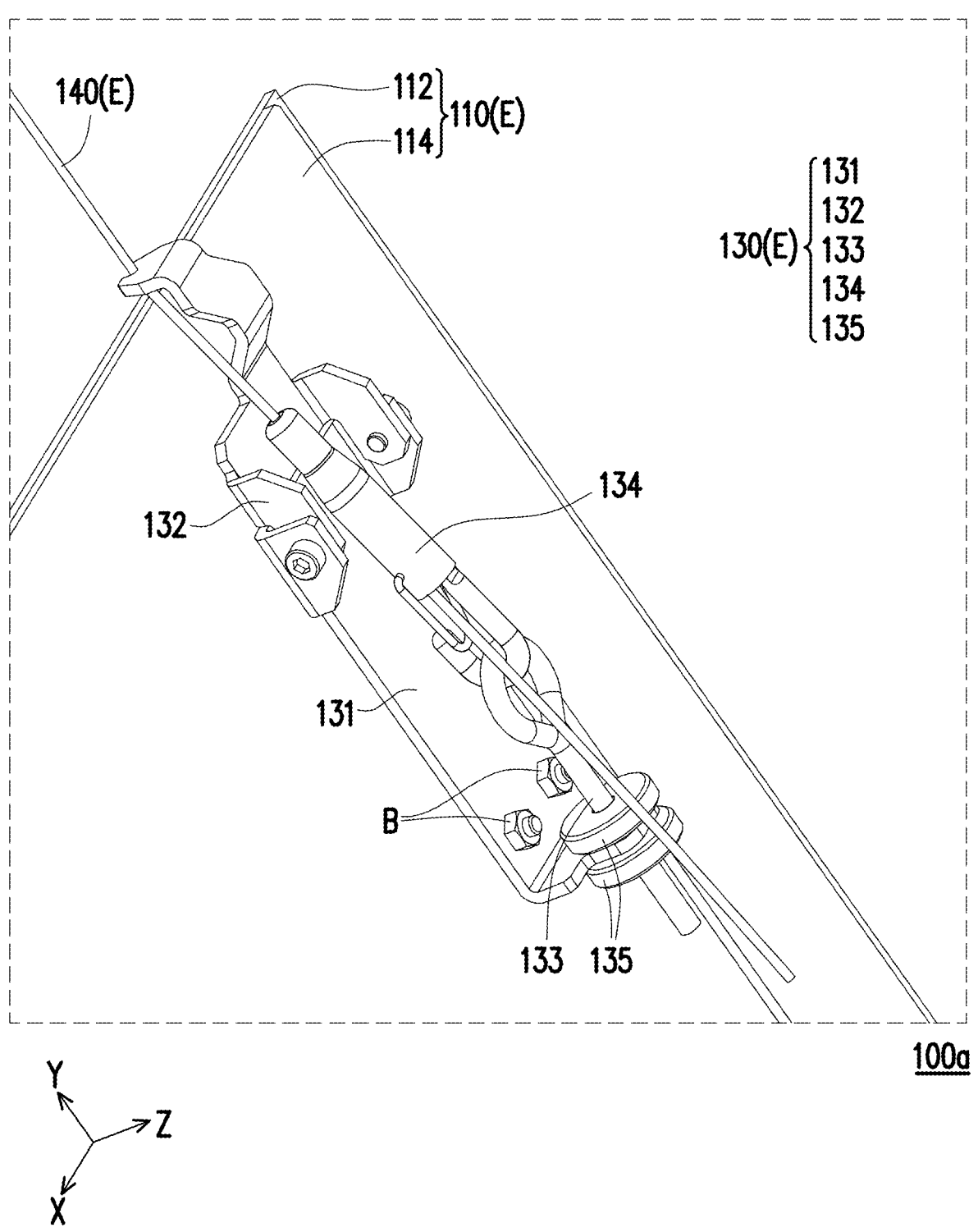
FIG. 2 is a partial three-dimensional schematic view of the electronic device of FIG. 1A.

FIG. 1A is a three-dimensional schematic view of a first light-emitting device and a second light-emitting device of an electronic device of an embodiment of the disclosure. FIG. 1B is a partially enlarged cross-sectional view of the first light-emitting device of the electronic device of FIG. 1A. FIG. 1C is a three-dimensional schematic view of an adjustment device and a suspension device of the electronic device of FIG. 1A. FIG. 2 is a partial three-dimensional schematic view of the electronic device of FIG. 1A. Please refer to FIG. 1A, FIG. 1B, FIG. 1C and FIG. 2 at the same time, the electronic device 100a includes at least one electronic unit (one electronic unit E schematically shown). The electronic unit E includes a first light-emitting device 110, an adjustment device 130 and a suspension device 140. The electronic unit E may further include a second light-emitting device 120 disposed adjacent to the first light-emitting device 110 and arranged in a first direction D1 parallel to Y direction. The adjustment device 130 is connected to the first light-emitting device 110 for adjusting a position state of the first light-emitting device 110. The suspension device 140 is connected to the adjustment device 130.

In more detail, the first light-emitting device 110 includes a light-emitting plate 112 and a back plate 114, and the adjustment device 130 is connected to the back plate 114. Herein, there is an adhesive layer 113 between the light-emitting plate 112 and the back plate 114, wherein the adhesive layer 113 is used to fix the light-emitting plate 112 and the back plate 114 for easy replacement of the light-emitting plate 112 and the back plate 114, but is not limited thereto. In some embodiments, the light-emitting plate 112 is fixed to the back plate 114 through magnets, tape (such as double-sided tape or magic tape), etc., to facilitate replacement. In some embodiments, the light-emitting plate 112 and the back plate 114 is fixed with screws or bolts. In some embodiments, the light-emitting plate 112 is composed of a plurality of light-emitting units, wherein each of the light-emitting unit includes a red light-emitting diode, a blue light-emitting diode and a green light-emitting diode, but not limited thereto. In some embodiments, the first light-emitting device 110 is Mini-LED display device. In some embodiments, the size of the light-emitting plate 112 is equal to or larger than the size of the back plate 114. The back plate 114 in the present embodiment includes a control board 115, at least one printed circuit board (third printed circuit boards 117 schematically shown) and a plurality of circuits 119. The control board 115 is electrically connected to the printed circuit boards 117 via the circuits 119. In some embodiments, a power cable (ex. an AC adapter) and a signal cable (ex. a HDMI) are connected to the control board 115.

Furthermore, the first light-emitting device 110 has a length L and a width W. In some embodiments, the length L of the first light-emitting device 110 is, for example, 550 mm, but is not limited. In some embodiments, the width W of the first light-emitting device 110 is, for example, 300 mm, but is not limited. In some embodiments, a size of the first light-emitting device 110 is 55 inches, but is not limited. The second light-emitting device 120 has the same structure as the first light-emitting device 110, and the second light-emitting device 120 and the first light-emitting device 110 are arranged in the first direction D1. In some embodiments, a plurality of light-emitting devices is arranged in the first direction D1, wherein the light-emitting devices arranged and spliced along the first direction D1 is defined as a vertical unit, and the minimum size of one vertical unit is 1 W (the width)×4L (the length) or 2W×4L.

In addition, the adjustment device 130 is fixed on the back plate 114 of the first light-emitting device 110 through the screws B but not limited thereto. In some embodiment, the adjustment device 130 is fixed on the first light-emitting device 110 by other appropriate means.

In some embodiment, a number of the adjustment device 130 is more than one. The adjustment device 130 includes an angle adjustment unit 132 to change an angle between the first light-emitting device 110 and the suspension device 140. In some embodiments, the angle adjustment unit 132 has an adjustment range of 0 to 5 degrees. Since the vertical tilt of the first light-emitting device 110 is adjusted using the angle adjustment unit 132, no additional bracket is required. The adjustment device 130 further includes a position adjustment unit 134 to change a height difference between the first light-emitting device 110 and the second light-emitting device 120. In addition, the adjustment device 130 further includes a main body 131, an adjust bolt 133 and an adjust nut 135. The main body 131 is fixed on the back plate 114 of the first light-emitting device 110. The angle adjustment unit 132 is rotatably connected to the main body 131, and the adjustment unit 134 is disposed on the main body 131. In some embodiments, the position adjustment unit 134 is a wire-griper, the suspension device 140 is a steel rope that connects to the rail and slides inside the rail, and the steel rope pass through wire-griper to change the height of the electronic unit E. That is, the electronic device 100a is secured in a suspended manner. The adjust bolt 133 and the adjust nut 135 connect to the position adjustment unit 134 to fine tune the height of the electronic unit E. In some embodiments, the adjustment device 130 is regarded as a wire hook structure. In short, the electronic device 100a of the present embodiment is a suspended display device, which can have a wider range of applications by changing its position through the adjustment device 130.

Figure 3B:
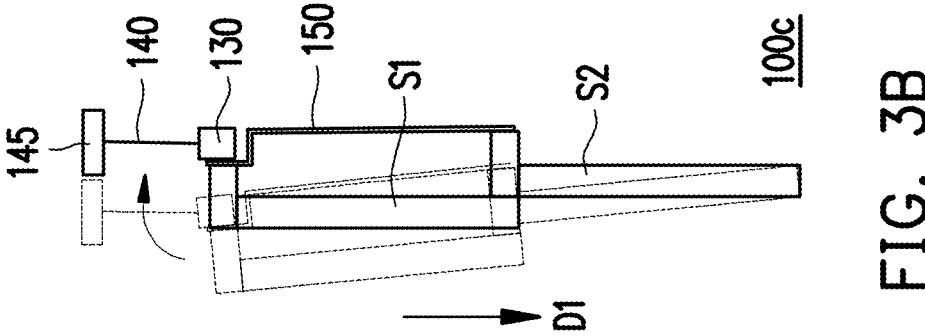
FIG. 3B is a schematic view of an electronic device of another embodiment of the disclosure.
Figure 3A:
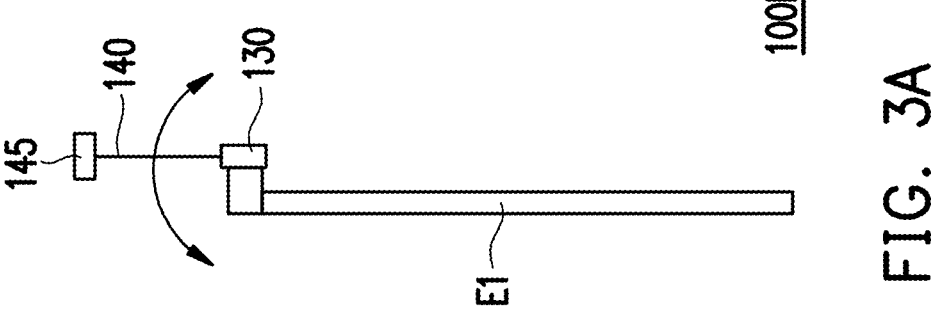
FIG. 3A is a schematic view of an electronic device of another embodiment of the disclosure.

FIG. 3A is a schematic view of an electronic device of another embodiment of the disclosure. Please refer to FIG. 3A, the electronic device 100b includes an electronic unit E1, the electronic unit E1 at least includes the first light-emitting device 110 and the second light-emitting device 120 as shown in FIG. 1A, but not limited thereto. The adjustment device 130 is connected to the electronic unit E1 for adjusting a position state of the electronic unit E1. The position state includes angle and/or height of the electronic unit E1 relative to the ground surface. The suspension device 140 connects the adjustment device 130 and the fixing element 145, wherein the fixing element 145 is, for example, a rail, a partition or a hook. The suspension device 140 is connected to the adjustment device 130 for suspending the vertical unit S1.

FIG. 3B is a schematic view of an electronic device of another embodiment of the disclosure. Referring to FIG. 3A and FIG. 3B at the same time, the electronic device 100c in FIG. 3B is similar to the electronic device 100b in FIG. 3A, so similar elements are denoted by the same reference numeral and the detailed description thereof is omitted herein. The difference between the electronic device 100c in FIG. 3B and the electronic device 100b in FIG. 3A lies in that the electronic device 100c includes a plurality of vertical units (the vertical unit S1 and the vertical unit S2 schematically shown) adjacent to each other and arranged in the first direction D1. The electronic device 100c further includes a connection plate 150 connecting the vertical unit S1 and the vertical unit S2. One end of the connection plate 150 is located between the vertical unit S1 and the adjustment device 130. Since the vertical unit S1 is connected to the vertical unit S2 through the connection plate 150, the center of gravity of the electronic device 100c changes and tilts. By adjusting the adjustment device 130, the tilted electronic device 100c can be adjusted back to the correct portion.

Figure 4A:
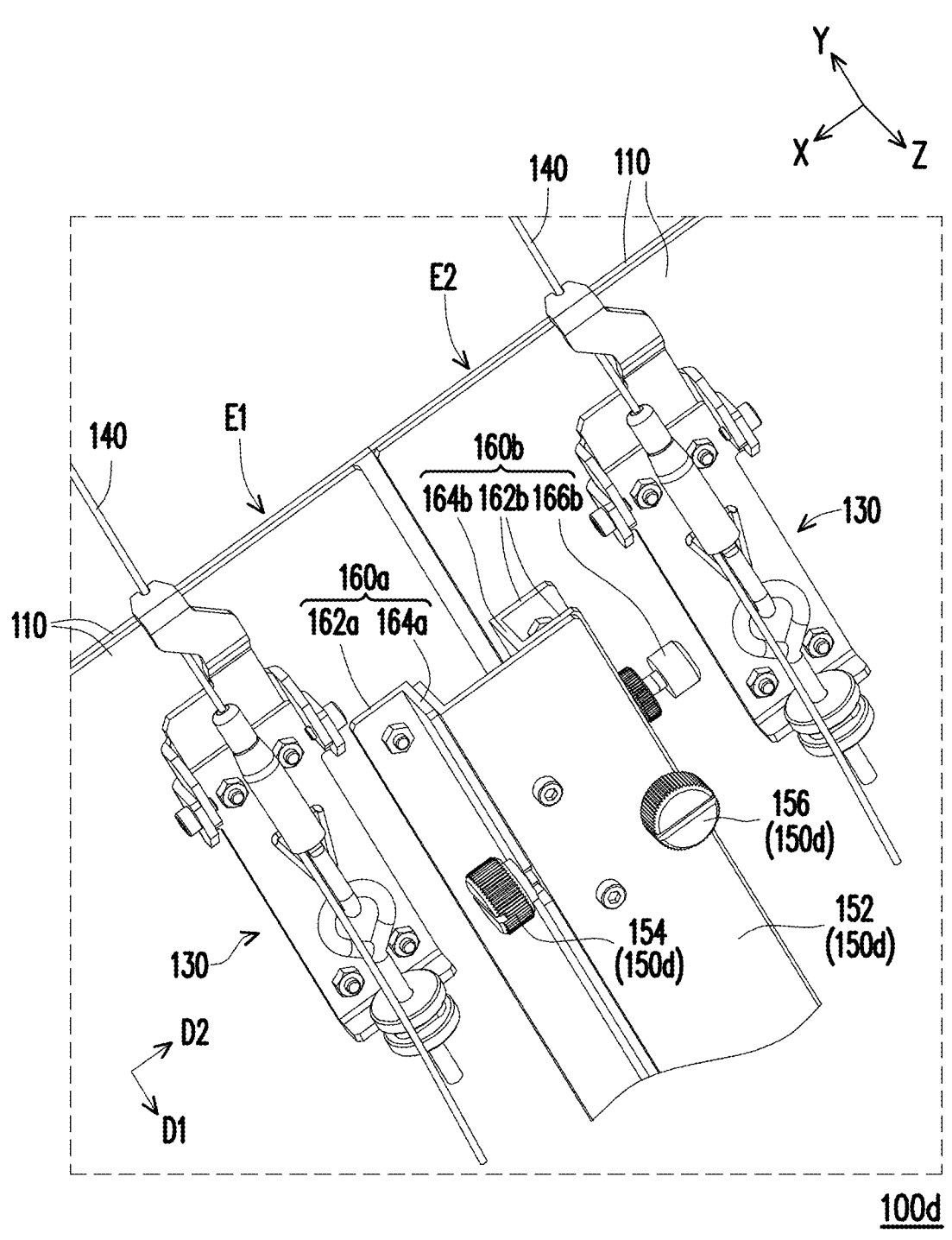
FIG. 4A is a three-dimensional schematic view of an electronic device of another embodiment of the disclosure.
Figure 4B:
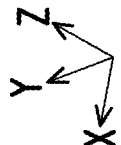
FIG. 4B is a partially disassembled three-dimensional schematic view of the electronic device of FIG. 4A in another view.
Figure 4B:
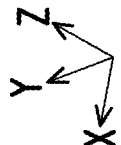
Figure 4C:
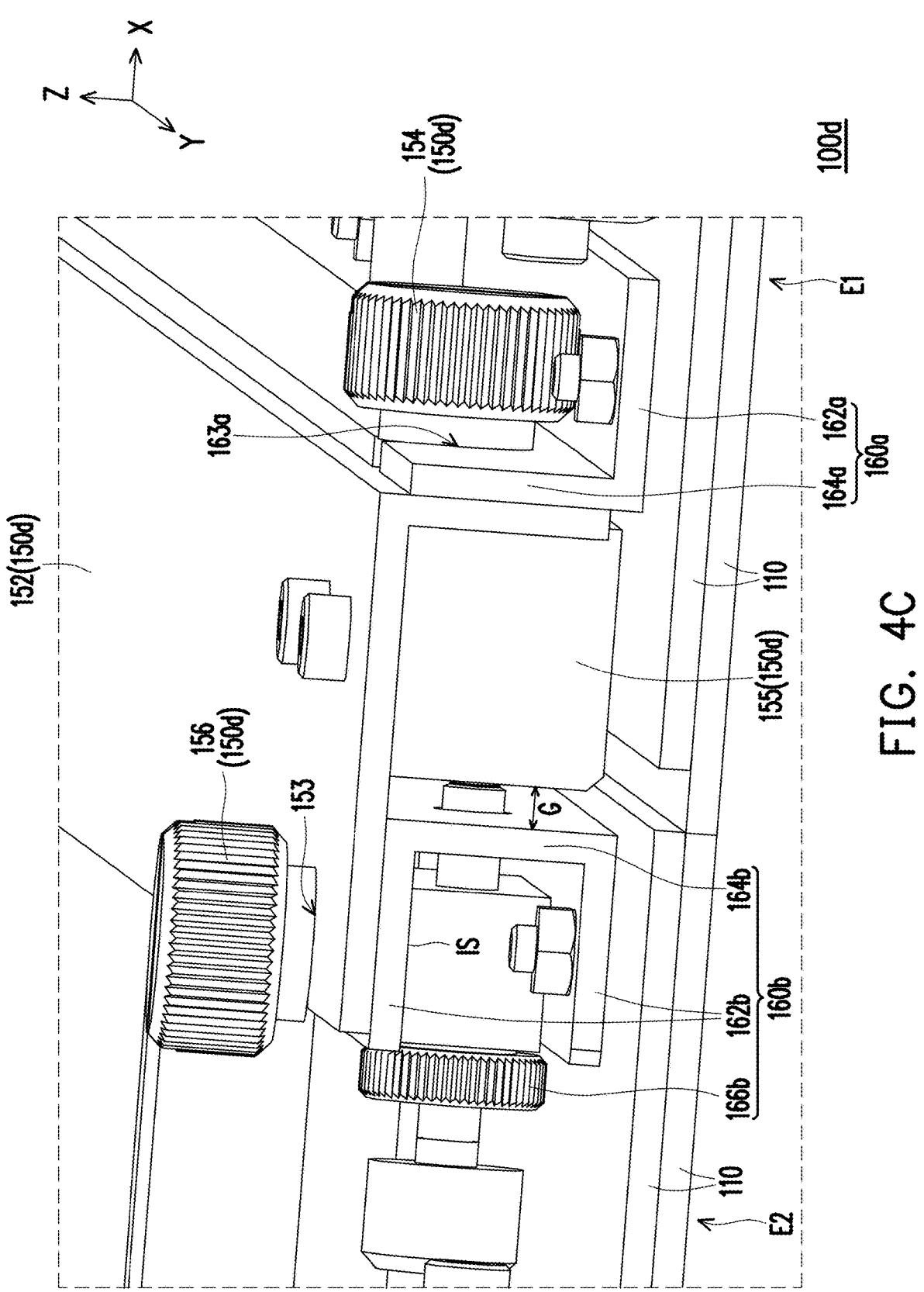
FIG. 4C is a partially enlarged three-dimensional schematic view of the electronic device of FIG. 4A in another view.

FIG. 4A is a three-dimensional schematic view of an electronic device of another embodiment of the disclosure. FIG. 4B is a partially disassembled three-dimensional schematic view of the electronic device of FIG. 4A in another view. FIG. 4C is a partially enlarged three-dimensional schematic view of the electronic device of FIG. 4A in another view. Referring to FIG. 3B and FIG. 4A at the same time, the electronic device 100d in FIG. 4A is similar to the electronic device 100c in FIG. 3B, so similar elements are denoted by the same reference numeral and the detailed description thereof is omitted herein. The difference between the electronic device 100d in FIG. 4A and the electronic device 100c in FIG. 3B lies in that the electronic device 100d includes a first electronic unit E1 and a second electronic unit E2 disposed adjacent to the first electronic unit E1, wherein the structure of the first electronic unit E1 and the structure of the second electronic unit E2 are the same as the above structure of the electronic unit E. The electronic device 100d further includes a connection assembly 150d connecting the first electronic unit E1 to the second electronic unit E2, wherein the electronic device 100d presents a flat display device. The second electronic unit E2 is spliced with the first electronic unit E1 by the connection assembly 150d along a second direction D2 parallel to the X direction. Herein, the second direction D2 is perpendicular to the first direction D1.

In more detail, please referring to FIG. 4A, FIG. 4B and FIG. 4C at the same time, the first electronic unit E1 includes a first fixing device 160a, and the second electronic unit E2 includes a second fixing device 160b, the connection assembly 150d connects the first fixing device 160a to the second fixing device 160b to splice the first electronic unit E1 and the second electronic unit E2. The first fixing device 160a includes a first portion 162a and a second portion 164a perpendicular to and connected to the first portion 162a. In some embodiments, a shape of the first fixing device 160a is L-shaped. In some embodiments, the first fixing device 160a is fixed on the first light-emitting device 110 of the first electronic unit E1 by, for example, fasteners (such as screws or blots), but not limited thereto. The second fixing device 160b includes a pair of third portions 162b parallel to each other, a fourth portion 164b connected to the pair of third portions 162b and parallel to the second portion 164b of the first fixing device 160a. The pair of third portions 162b and the fourth portion 164b are arranged in a U-like shape. In some embodiments, the second fixing device 160b is fixed on the first light-emitting device 110 of the second electronic unit E2 by, for example, fasteners (such as screws or blots), but not limited thereto.

The connection assembly 150d includes a connection plate 152, a first fastener 154 and a second fastener 156. In some embodiment, the connection plate 152 of the connection assembly 150d is L-shaped. The connection plate 152 has a plurality of fixing holes 153, the first fixing device 160a has a first fixing hole 163a, and the second fixing device 160b has a second fixing hole 163b. The first fastener 154 passes through one of the fixing holes 153 and the first fixing hole 163a of the first fixing device 160a to secure the connection plate 152 and the first fixing device 160a. The second fastener 156 passes through another of the fixing holes 153 of the connection plate 152 and the second fixing hole 163b of the second fixing device 160b to secure the connection plate 152 and the second fixing device 160b. Herein, a first fixing direction F1 of the first fastener 154 is perpendicular to a second fixing direction F2 of the second fastener 156, but not limited thereto. Referring to FIG. 4C, the connection assembly 150d further includes an abutting portion 155 disposed between the second portion 164a of the first fixing device 160a and the fourth portion 164b of the second fixing device 160b. The abutting portion 155 is in contact with an inside surface IS of the connection plate 152. The adjustment element 166b passes through the fourth portion 164b to adjust a distance G between the fourth portion 164b and the abutting portion 155. In other words, in addition to splicing the first electronic unit E1 and the second electronic unit E2, the connection assembly 150d can also adjust the distance G between the first electronic unit E1 and the second electronic unit E2.

Figure 5:
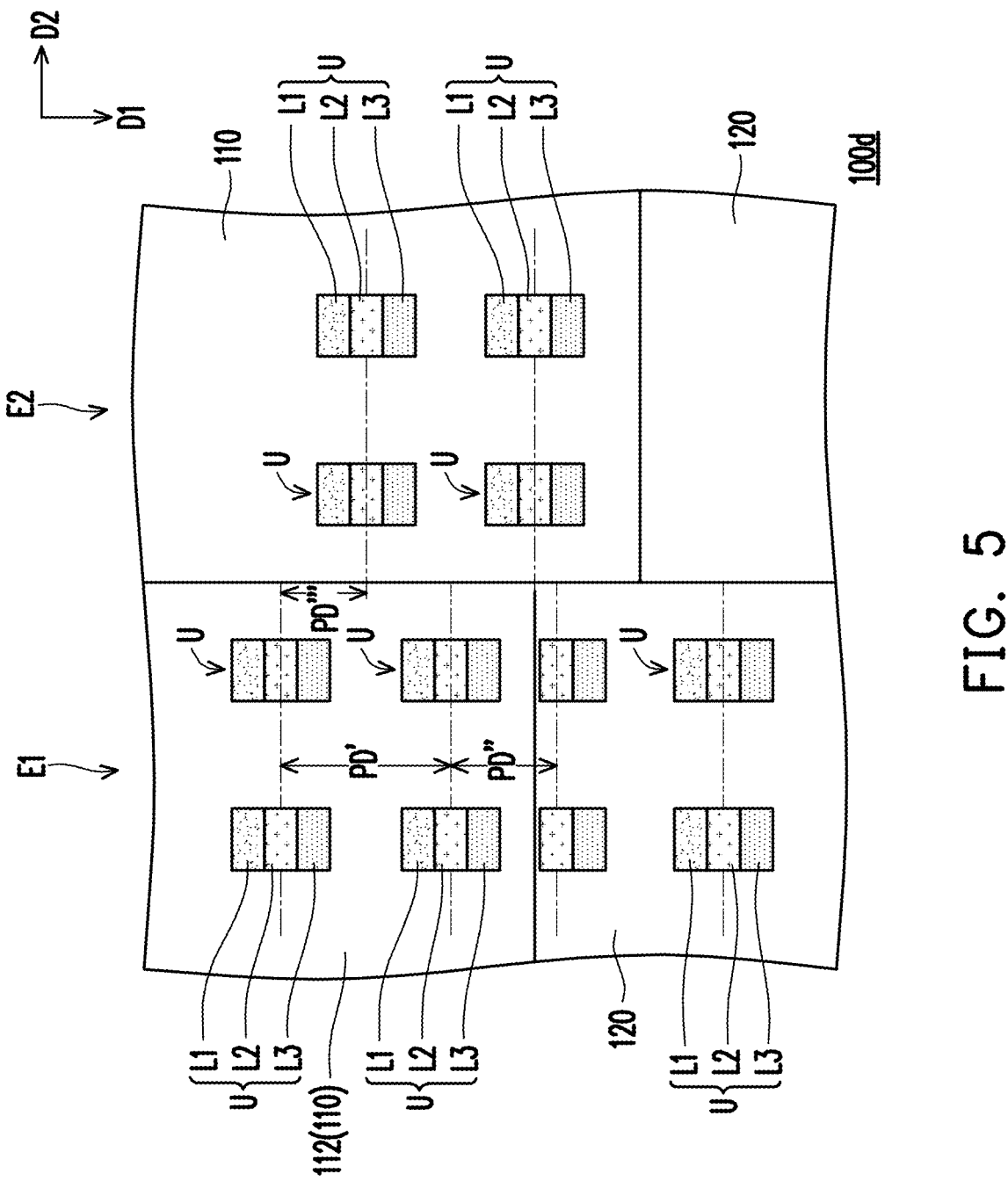
FIG. 5 is a schematic view of the electronic device of FIG. 4A on a light emitting surface.

FIG. 5 is a schematic view of the electronic device of FIG. 4A on a light emitting surface. Referring to FIG. 4A and FIG. 5 at the same time, the first light-emitting device 110 of the first electronic unit E1 includes a plurality of light emitting units U disposed on the light-emitting plate 112. Each of the light emitting units U includes a first light emitting element L1, a second light emitting element L2 and a third light emitting element L3. In some embodiments, the first light emitting element L1 is a red light-emitting diode, the second light emitting element L2 is a blue light-emitting diode, and the third light emitting element L3 is a green light-emitting diode, but is not limited thereto. In some embodiments, first light-emitting device 110 is Mini-LED display device. The structure of the second light-emitting device 120 of the first electronic unit E1, the structure of the first light-emitting device 110 of second electronic unit E2 and the structure of the second light-emitting device 120 of the second electronic unit E2 are the same as the above structure of the first light-emitting device 110 of the first electronic unit E1. The second light-emitting device 120 of the first electronic unit E1 is disposed adjust to the first light-emitting device 110 of the first electronic unit E1 and arranged in the first direction D1. The first light-emitting device 110 of the second electronic unit E2 is disposed adjust to the first light-emitting device 110 of the first electronic unit E1 and arranged in the second direction D2. The second light-emitting device 120 of the second electronic unit E2 is disposed adjust to the first light-emitting device 110 of the second electronic unit E2 and arranged in the first direction D1. In the first light-emitting device 110 of the first electronic unit E1, the distance PD' between two adjacent light emitting units U may be a pixel pitch and will be fixed. A distance PD" which is defined a distance between a pixel of the first light-emitting device 110 and a pixel of the second light-emitting device 120 adjacent to the first light-emitting device 110 that can be finely adjusted in the first direction D1 through the adjust bolt 133 and the adjust nut 135 of the adjustment device 130 is, for example, 1.2 mm. In the second light-emitting device 120 of the first electronic unit E1, through fine adjustment of the adjustment device 130 in the first direction D1, the first light emitting element L1 which is relatively adjacent to the first light-emitting device 110 obscured by splicing errors can be revealed. A distance PD''' which is defined a distance between a pixel of the first light-emitting device 110 of the first electronic unit E1 and a pixel of the first light-emitting device 110 of the electronic unit E2 adjacent to the first light-emitting device 110 in the first direction D1. The distance PD''' may be adjusted and smaller is better. In the first light-emitting device 110 of the second electronic unit E2, through fine adjustment of the adjustment device 130 in the first direction D1, the light emitting units U in the first light-emitting device 110 of the first electronic unit E1 may be aligned with the light emitting units U in the first light-emitting device 110 of the second electronic unit E2.

Figure 6A:
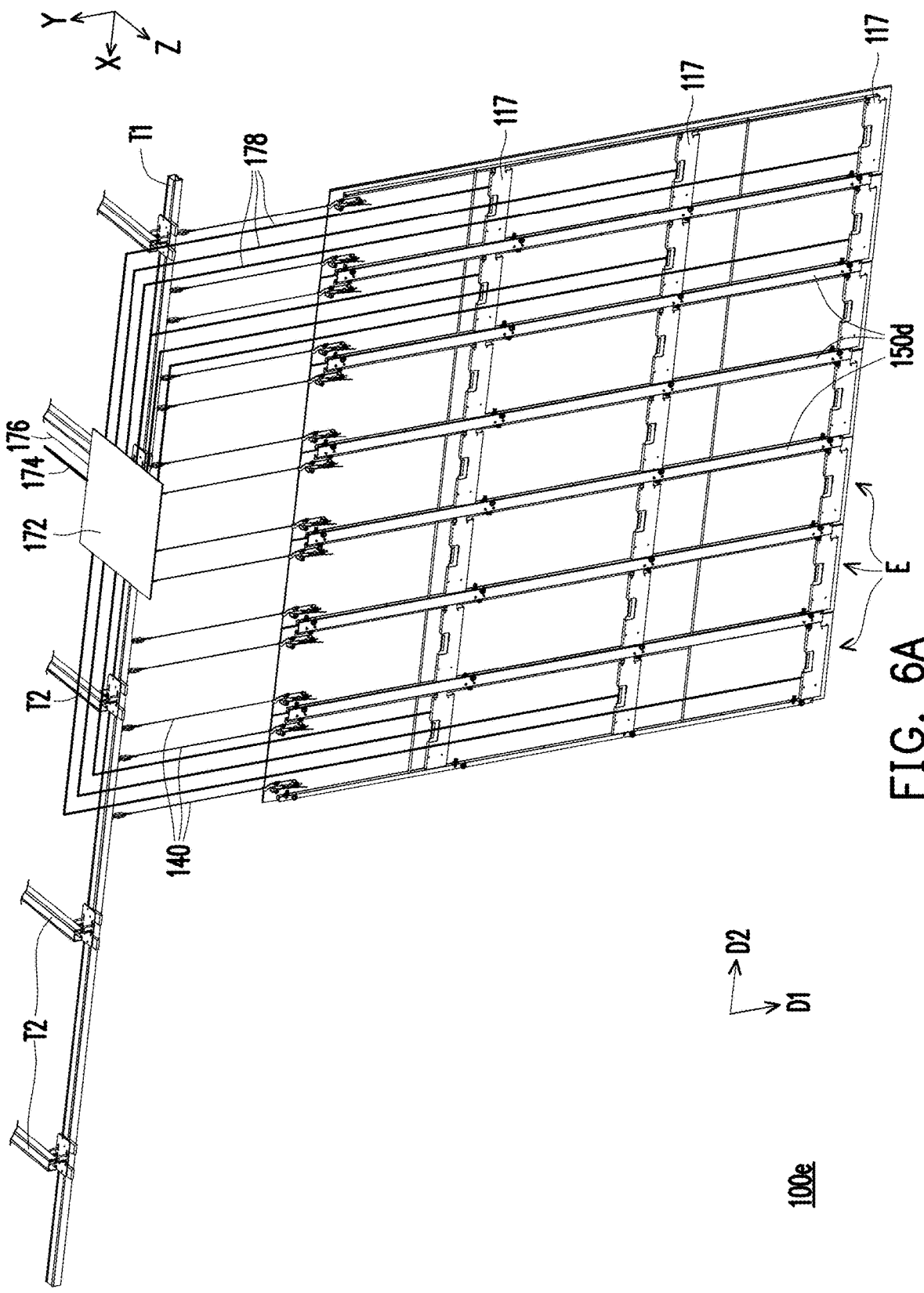
FIG. 6A is a three-dimensional schematic view of an electronic device of another embodiment of the disclosure.

FIG. 6A is a three-dimensional schematic view of an electronic device of another embodiment of the disclosure. Referring to FIG. 4A and FIG. 6A at the same time, the electronic device 100e in FIG. 6A is similar to the electronic device 100d in FIG. 4A, so similar elements are denoted by the same reference numeral and the detailed description thereof is omitted herein. The difference between the electronic device 100e in FIG. 6A and the electronic device 100d in FIG. 4A lies in that the electronic device 100e are suspended from a rail T1 through the two suspension devices 140 and can slide relative to the rail T1 to change its position. In some embodiment, the electronic device 100e are suspended from the partition or the hook, etc., through the suspension device 140. In more detail, the electronic units E are spliced together along the second direction D2, wherein the two adjacent electronic units E are connected through the connection assembly 150d. The electronic device 100e further includes a control board 172, a power cable 174 and a signal cable 176 and a plurality of circuits 178. The control board 172 is disposed on the rail T1 and a rail T2, wherein the rail T2 is set up on the rail T1, and an extension direction of the rail T2 is different from (ex. perpendicular to) an extension direction of the rail T1. The rail T2 can be slid relative to the rail T1 to change the distance and/or position of the electronic units E relative to the viewer. The power cable 174, the signal cable 176 and the circuits 178 are electrically connected to the control board 172, and the circuits 178 are electrically connected the control board 172 to the printed circuit boards 117 of the electronic units E. The circuits 178 extend from the control board 172 to the electronic units E to electrically connected to the printed circuit boards 117 of the electronic units E. In short, the electronic device 100*e* of the present embodiment control the display of the electronic units E through one control board 172.

Figure 6B:
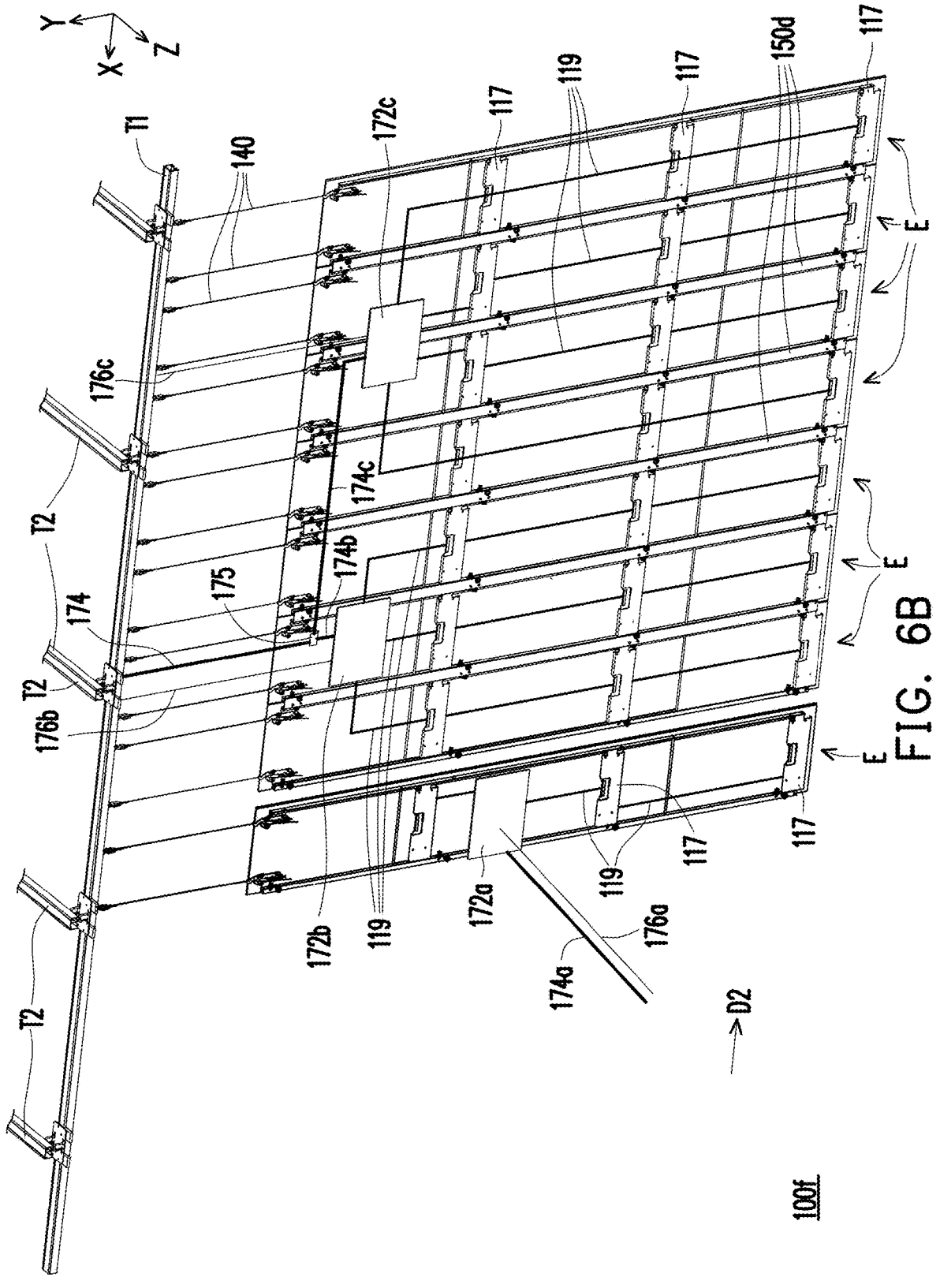
FIG. 6B is a three-dimensional schematic view of an electronic device of another embodiment of the disclosure.

FIG. 6B is a three-dimensional schematic view of an electronic device of another embodiment of the disclosure. Referring to FIG. 6A and FIG. 6B at the same time, the electronic device 100*f* in FIG. 6B is similar to the electronic device 100*e* in FIG. 6A, so similar elements are denoted by the same reference numeral and the detailed description thereof is omitted herein. The difference between the electronic device 100*f* in FIG. 6B and the electronic device 100*e* in FIG. 6A lies in that the electronic device 100*f* not has one control board, but has a plurality of control boards. The electronic device 100*f* further includes a first control board 172*a*, a second control board 172*b*, a third control board 172*c*, a plurality of power cables (a power cable 174 and a power cable 174*a* schematically shown), and a plurality of signal cables (a signal cable 176*a*, a signal cable 176*b* and a signal cable 176*c* schematically shown). The first control board 172*a* is disposed on one of the electronic units E. The second control board 172*b* is disposed on one of at least three of the electronic units E spliced together through the connection assemblies 150*d* along the second direction D2. The third control board 172*c* is disposed on one of at least four of the electronic units E spliced together through the connection assemblies 150*d* along the second direction D2. The power cable 174*a* and the signal cable 176*a* are electronically connected to the first control board 172*a*, and the first control board 172*a* is electrically connected to the printed circuit boards 117 of the electronic units E via the circuits 119. The electronic device 100*f* further includes a shunt 175 connected to one of the power cables 174 to distribute a power source to the second control board 172*b* and the third control board 172*c*. The power cable 174 is electrically connected to a power cable 174*b* and a power cable 174*b* via the shunt 175. The power cable 174*b* and the signal cable 176*b* are electronically connected to the second control board 172*b*, and the second control board 172*b* is electrically connected to the printed circuit boards 117 of the electronic units E via the circuits 119. The power cable 174*c* and the signal cable 176*c* are electronically connected to the third control board 172*c*, and the third control board 172*c* is electrically connected to the printed circuit boards 117 of the electronic units E via the circuits 119. That is, the first control board 172*a* controls one electronic unit E, the second control board 172*b* controls at least three electronic units E, and the third control board 172*c* controls at least four electronic units E. That is, the electronic units E can be displayed individually and/or in multiples. In short, the desired control board(s) can be configured based on cost and/or display requirements.

Figure 7:
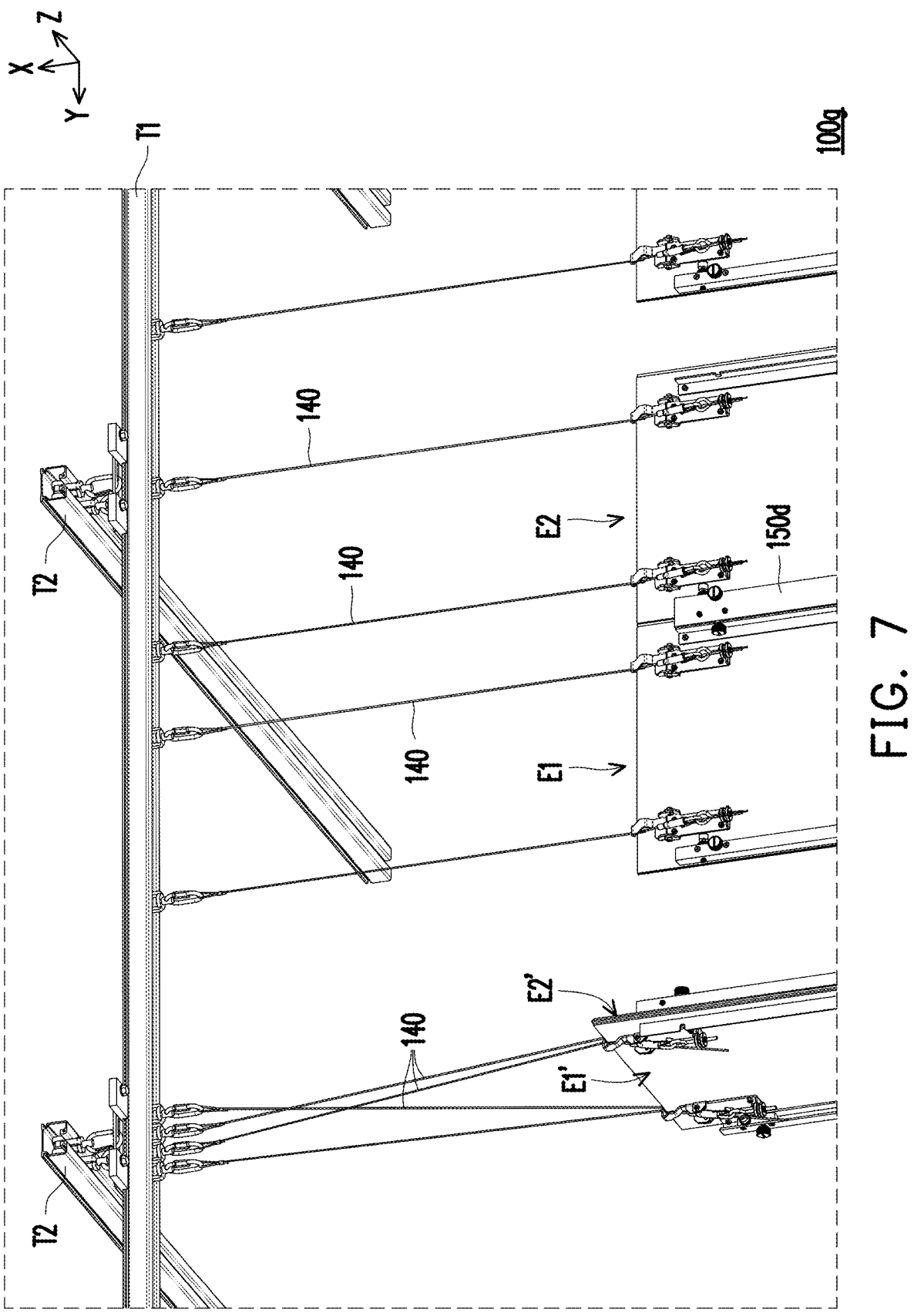
FIG. 7 is a three-dimensional schematic view of an electronic device of another embodiment of the disclosure.

FIG. 7 is a three-dimensional schematic view of an electronic device of another embodiment of the disclosure.

Referring to FIG. 6A and FIG. 7 at the same time, the electronic device 100*g* in FIG. 7 is similar to the electronic device 100*e* in FIG. 6A, so similar elements are denoted by the same reference numeral and the detailed description thereof is omitted herein. The difference between the electronic device 100*g* in FIG. 7 and the electronic device 100*e* in FIG. 6A lies in that the first electronic unit E1 and the second electronic unit E2, which are spliced through the connection assembly 150*d*, are suspended from the rail T1 through the suspension devices 140 to present a displayed state. The first electronic unit E1' and the second electronic unit E2' are suspended from the rail T1 through the suspension devices 140 to present a stowed state, such as a louvered window, to free up effective space. In some embodiment, the display surface of the first electronic unit E1' and the display surface of the second electronic unit E2' are closed face-to-face so as to protect the display surfaces. In more detail, the rail T2 is set up on the rail T1, and an extension direction of the rail T2 is different from (ex. perpendicular to) an extension direction of the rail T1. The rail T2 can be slid relative to the rail T1 to change the distance and/or position of the first electronic unit E1 and the second electronic unit E2 relative to the viewer. The suspension devices 140 of the first electronic unit E1 and the second electronic unit E2 and the suspension devices 140 of the first electronic unit E1' and the second electronic unit E2' slide on the rail T1 to present the first electronic unit E1 and the second electronic unit E2 in the display state and to present the first electronic unit E1' and the second electronic unit E2' in the stowed state. In short, the user can easily change the state of the electronic units by sliding the suspension devices 140 relative to the rail T1.

Figure 8A:
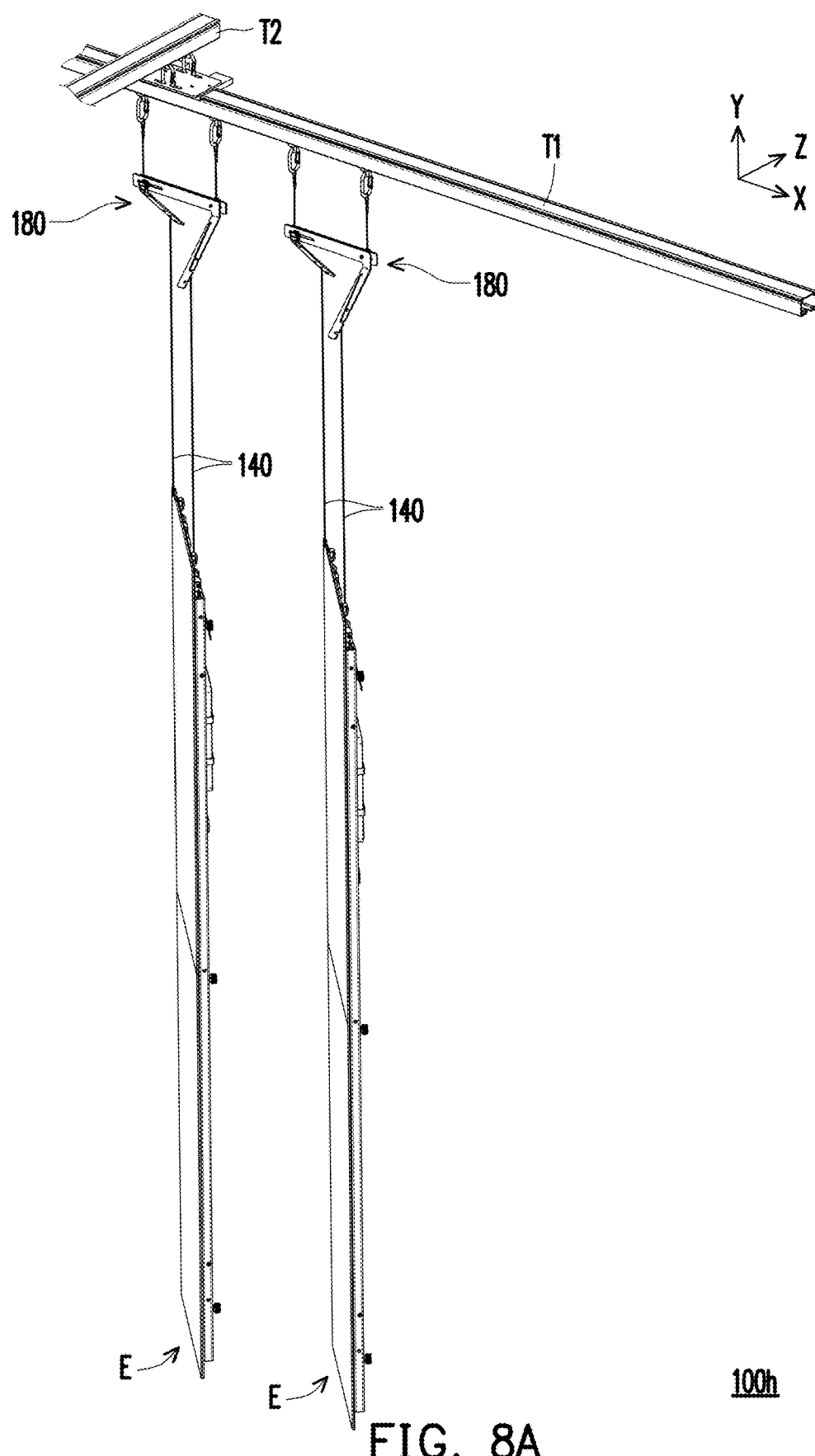
FIG. 8A is a three-dimensional schematic view of an electronic device of another embodiment of the disclosure.
Figure 8B:
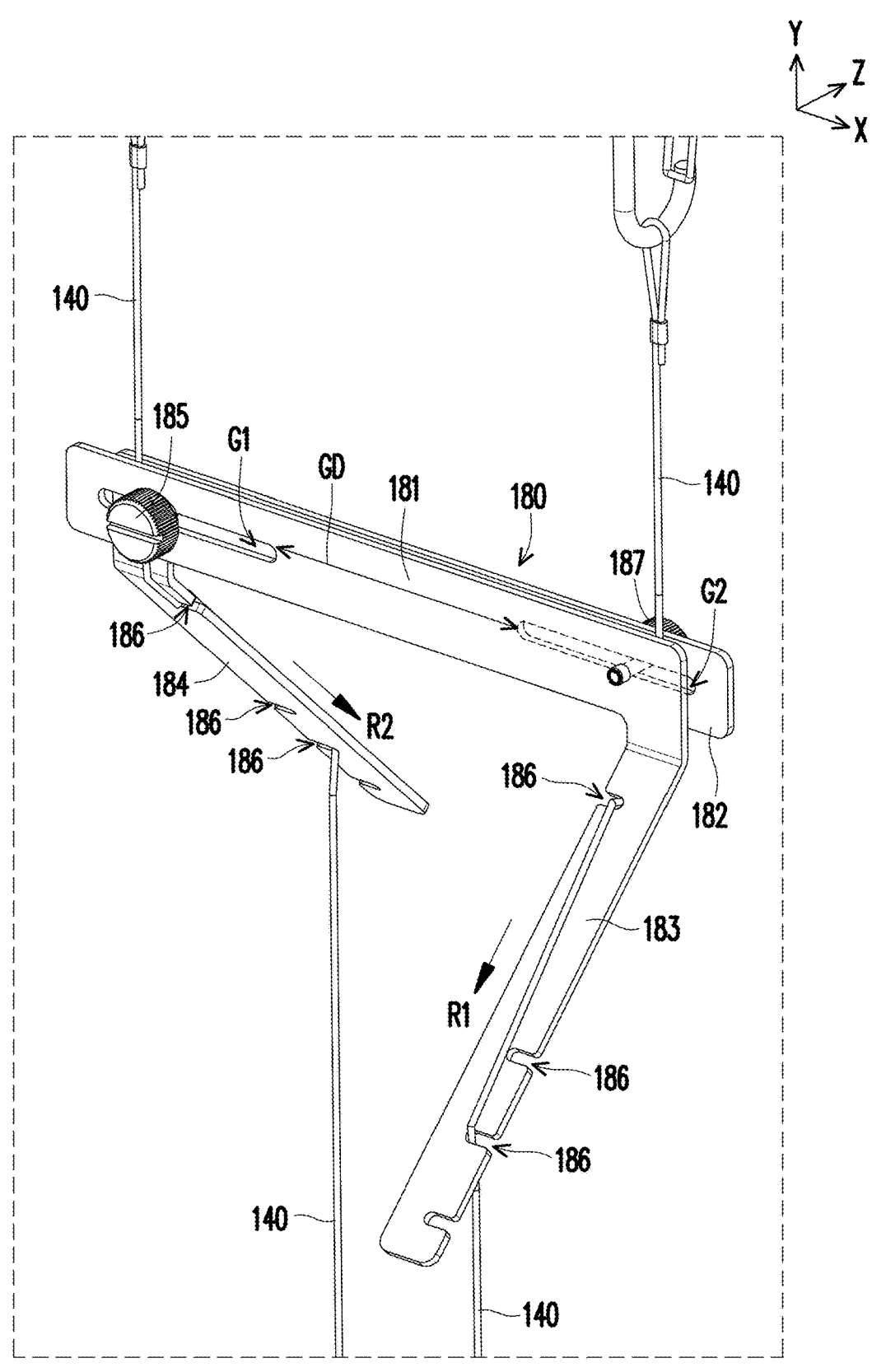
FIG. 8B is a partially enlarged three-dimensional schematic view of the electronic device of FIG. 8A.

FIG. 8A is a three-dimensional schematic view of an electronic device of another embodiment of the disclosure. FIG. 8B is a partially enlarged three-dimensional schematic view of the electronic device of FIG. 8A. Referring to FIG. 7 and FIG. 8A at the same time, the electronic device 100*h* in FIG. 8A is similar to the electronic device 100*g* in FIG. 7, so similar elements are denoted by the same reference numeral and the detailed description thereof is omitted herein. The difference between the electronic device 100*h* in FIG. 8A and the electronic device 100*g* in FIG. 7 lies in that the electronic device 100*h* further includes a turn bracket 180 disposed on the two suspension devices 140, wherein the turn bracket 180 is located between the rail T1 and the electronic unit E to change the direction of the electronic unit E. In more details, referring to FIG. 8A and FIG. 8B at the same time, the turn bracket 180 includes a first plate 181, a first extension portion 183 connecting the first plate 181, a second plate 182, a second extension portion 184 connecting the second plate 182, a first screw knob 185 and a second screw knob 187. The first plate 181 is superimposed on the second plate 182 and movers relative to each other in the X direction. The first plate 181 has a first groove G1, and the second plate 182 has a second groove G2. An orthographic projection of the first groove G1 on the second plate 182 may not overlap the second groove G2. An extension direction R1 of the first extension portion 183 is different from an extension direction R2 of the second extension portion 184. The first screw knob 185 and the second screw knob 187 are slid into the first groove G1 and the second groove G2, respectively, to adjust a distance GD between the first groove G1 and the second groove G2. Furthermore, the first extension portion 183 and the second extension portion 184 have a plurality of fixing slots 186, respectively, and the two suspension devices 140 pass between the first plate 181 and the second plate 182 and are respectively limited to at least one of the fixing slots 186 of the first extension portion 183 and at least one of the fixing slots 186 of the second extension portion 184 to change an angle of the electronic unit E. Namely, without sacrificing the convenience of the suspension method, the angle and/or the shape of the electronic device 100*h* can be changed by using the turn bracket 180 to clamp the two suspension devices 140 and limit the two suspension devices 140 to the fixing slots 186.

Figure 9A:
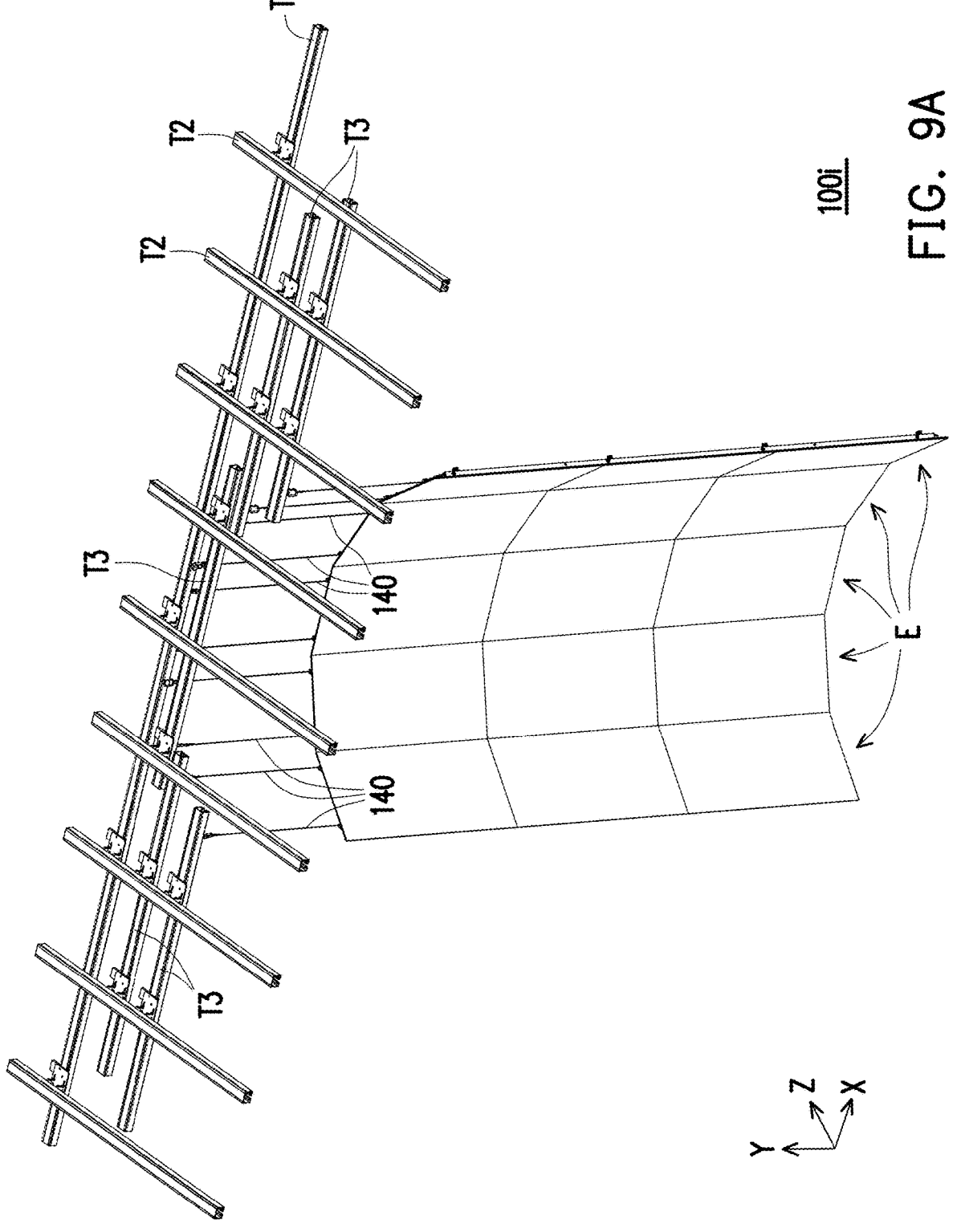
FIG. 9A is a three-dimensional schematic view of an electronic device of another embodiment of the disclosure.

FIG. 9A is a three-dimensional schematic view of an electronic device of another embodiment of the disclosure. Referring to FIG. 7 and FIG. 9A at the same time, the electronic device 100*i* in FIG. 9A is similar to the electronic device 100*g* in FIG. 7, so similar elements are denoted by the same reference numeral and the detailed description thereof is omitted herein. The difference between the electronic device 100*i* in FIG. 9A and the electronic device 100*g* in FIG. 7 lies in that the electronic units E spliced together are suspended from the rail T1 and a plurality of rails T3 through the suspension devices 140 in an arc-shaped. Namely, the electronic units E are spliced together and arranged in an arc, so that the electronic device 100*i* is present arc-shaped display state. In more details, the rails T3 are set up on the rail T2, and an extension direction of each of the rails T3 is parallel to an extension direction of the rail T1. The rails T3 can be slid relative to the rail T2 to change the distance and/or position of the electronic units E relative to the viewer. Herein, the length of each of the rails T3 is less than the length of the rail T1. The number of the rails T3 is more than the number of the rail T1. The rails T3 are closed to the electronic units E than the rail T1. The display shape of the electronic device 100*i* can be adjusted by changing the configuration position and the quantity of the rails T3.

Figure 9B:
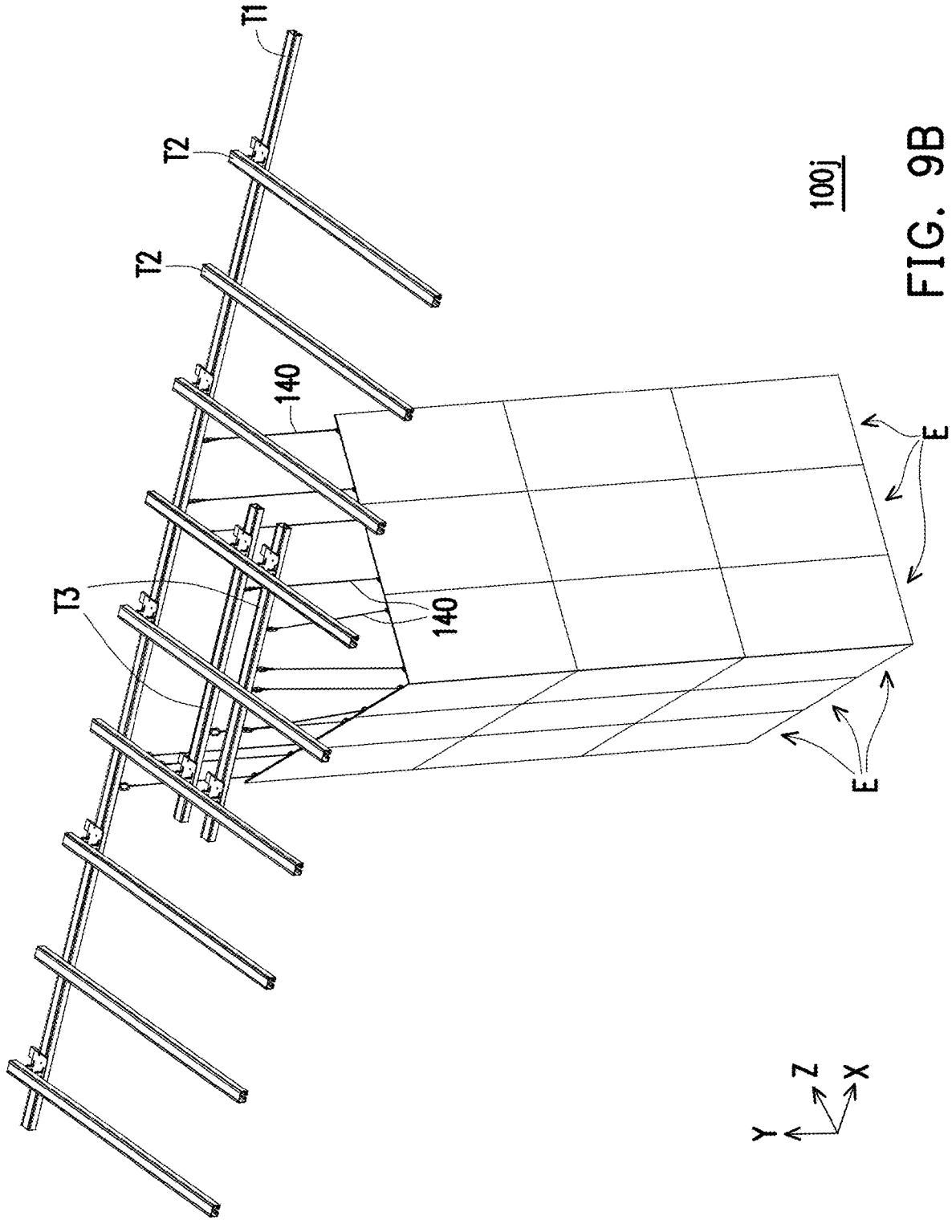
FIG. 9B is a three-dimensional schematic view of an electronic device of another embodiment of the disclosure.

FIG. 9B is a three-dimensional schematic view of an electronic device of another embodiment of the disclosure. Referring to FIG. 7 and FIG. 9B at the same time, the electronic device 100*j* in FIG. 9B is similar to the electronic device 100*g* in FIG. 7, so similar elements are denoted by the same reference numeral and the detailed description thereof is omitted herein. The difference between the electronic device 100*j* in FIG. 9B and the electronic device 100*g* in FIG. 7 lies in that the electronic units E spliced together are suspended from the rail T1 and a plurality of rails T3 through the suspension devices 140 in a V-shaped. Namely, the electronic units E are spliced together and arranged in the V-shaped, so that the electronic device 100*j* is present V-shaped display state. In more details, the rails T3 are set up on the rail T2, and an extension direction of each of the rails T3 is parallel to an extension direction of the rail T1. The rails T3 can be slid relative to the rail T2 to change the distance and/or position of the electronic units E relative to the viewer. Herein, the length of each of the rails T3 is less than the length of the rail T1. The number of the rails T3 is more than the number of the rail T1. The rails T3 are closed to the electronic units E than the rail T1. The display shape of the electronic device 100*j* can be adjusted by changing the configuration position and the quantity of the rails T3.

Figure 10:
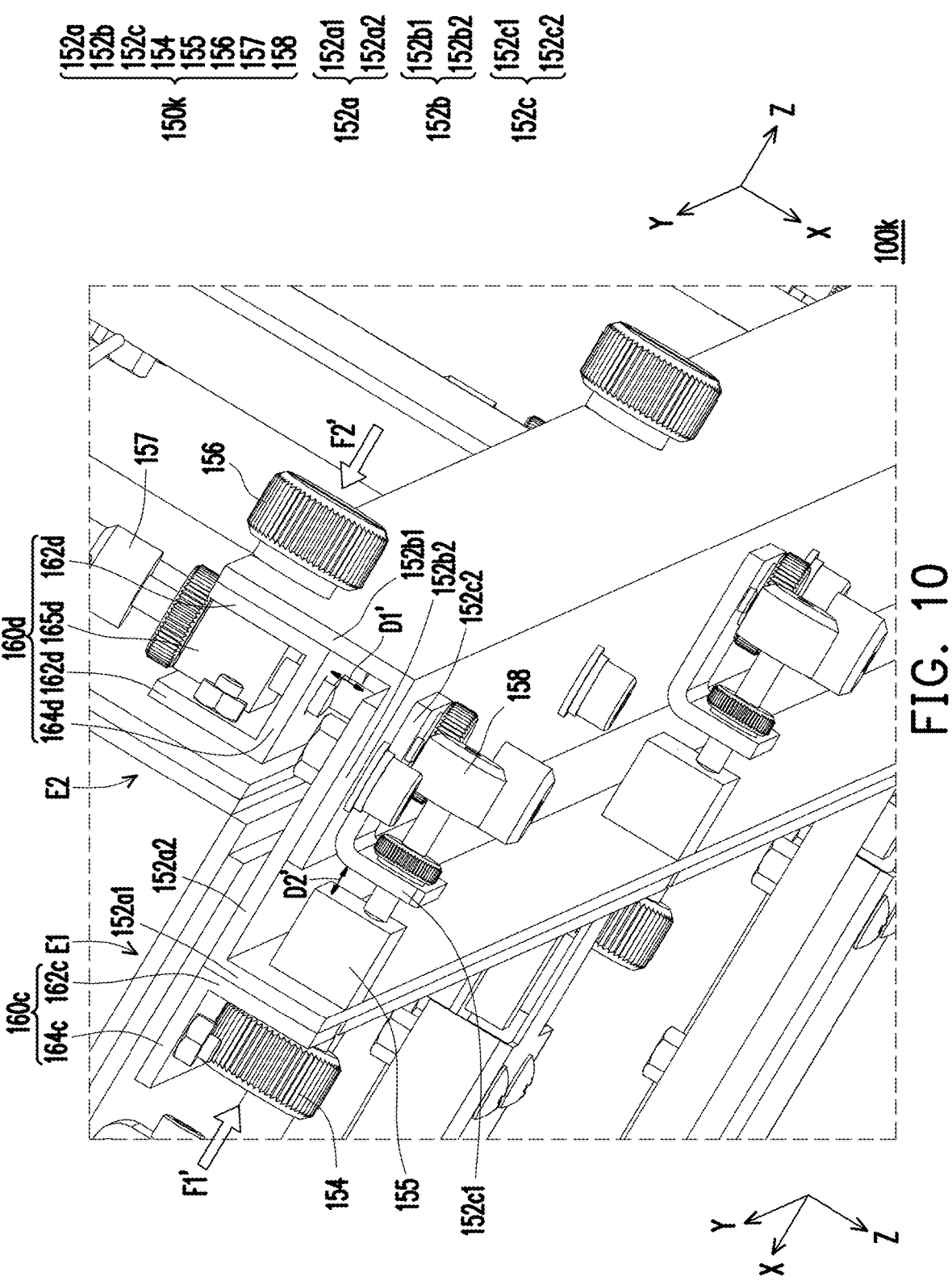
FIG. 10 is a partially enlarged three-dimensional schematic view of an electronic device of another embodiment of the disclosure.

FIG. 10 is a partially enlarged three-dimensional schematic view of an electronic device of another embodiment of the disclosure. Referring to FIG. 4B and FIG. 10 at the same time, the electronic device 100*k* in FIG. 10 is similar to the electronic device 100*d* in FIG. 4B, so similar elements are denoted by the same reference numeral and the detailed description thereof is omitted herein. The difference between the electronic device 100*k* in FIG. 10 and the electronic device 100*d* in FIG. 4B lies in that instead of the flat display device, the electronic device 100*k* presents a 3D display device, i.e. a folding display device. In more detail, the connection assembly 150*k* of the electronic device 100*k* includes a first connection plate 152*a*, a second connection plate 152*b*, a third connection plate 152*c*, a first fastener 154 and a second fastener 156. The first connection plate 152*a* includes a first connection portion 152*a*1 and a second connection portion 152*a*2 perpendicular to the first connection portion 152*a*1. In some embodiment, the first connection plate 152*a* is L-shaped. The second connection plate 152*b* includes a third connection portion 152*b*1 and a fourth connection portion 152*b*2 perpendicular to the third connection portion 152*b*1. In some embodiment, the second connection plate 152*b* is L-shaped. The third connection plate 152*c* includes a fifth connection portion 152*c*1 and a sixth connection portion 152*c*2 perpendicular to the fifth connection portion 152*c*1. In some embodiment, the third connection plate 152*c* is L-shaped. The second connection portion 152*a*2 of the first connection plate 152*a* is fixed to the fourth connection portion 152*b*2 of the second connection plate 152*b*. In some embodiment, the second connection portion 152*a*2 and the fourth connection portion 152*b*2 are fixed through fasteners, such as screws or bolts, but not limited thereto. The sixth connection portion 152*c*2 of the third connection plate 152*c* is fixed to the fourth connection portion 152*b*2 of the second connection plate 152*b*. In some embodiment, the sixth connection portion 152*c*2 and the fourth connection portion 152*b*2 are fixed through fasteners, such as screws or bolts, but not limited thereto. The first fastener 154 passes through the first fixing device 160*c* of the first electronic unit E1 to secure to the first connection portion 152*a*1 of the first connection plate 152*a*. The second fastener 156 passes through the third connection portion 152*b*1 of the second connection plate 152*b* to secure to the second fixing device 160*d* of the second electronic unit E2. Herein, a first fixing direction F1' of the first fastener 154 is parallel to a second fixing direction F2' of the second fastener 156.

Furthermore, the first fixing device 160*c* of the first electronic unit E1 includes a first portion 162*c* and a second portion 164*c* perpendicular to the first portion 162*c*. In some embodiment, the first fixing device 160*c* is L-shaped. In some embodiments, the first fixing device 160*c* is fixed on the first electronic unit E1 by, for example, fasteners (such as screws or blots), but not limited thereto. The second fixing device 160*d* of the second electronic unit E2 includes a pair of third portions 162*d* parallel to each other, a fourth portion 164*d* connected to the pair of third portions 162*d* and a first abutting portion 165*d* disposed between the pair of third portions 162*d*. The pair of third portions 162*d* and the fourth portion 164*d* are arranged in a U-like shape. In some embodiments, the second fixing device 160*d* is fixed on the second electronic unit E2 by, for example, fasteners (such as screws or blots), but not limited thereto. The connection assembly 150*k* further includes a second abutting portion 155 disposed on the first connection portion 152*a*1 of the first connection plate 152, a first adjustment element 157 and a second adjustment element 158. The first adjustment element 157 passes through the first abutting portion 165*d* and the fourth portion 164*d* of the second fixing device 160*d* to adjust a first distance D1' between the fourth portion 164*d* of the second fixing device 160*d* and the second connection portion 152*a*2 of the first connection plate 152*a*. The second adjustment element 158 passes through the fifth connection portion 152*c*1 of the third connection plate 152*c* to adjust a second distance D2' between the fifth connection portion 152*c*1 and the second abutting portion 155 of the connection assembly 150*k*. In other words, the first electronic unit E1 and the second electronic unit E2 are spliced using anglejoint to adjust the gaps and the postures between the first electronic unit E1 and the second electronic unit E2.

In summary, in an embodiment of the present disclosure, the adjustment device is connected to the first light-emitting device, and the suspension device is connected to the adjustment device, thereby changing the position state and expanding the application scope of the electronic device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
   at least one electronic unit, each of the at least one electronic unit comprising:
      a first light-emitting device;
      an adjustment device connected to the first light-emitting device for adjusting a position state of the first light-emitting device; and
      a suspension device connected to the adjustment device,
   wherein the at least one electronic unit comprises a first electronic unit and a second electronic unit disposed adjacent to the first electronic unit, and the electronic device further comprises:
   a connection assembly connecting the first electronic unit to the second electronic unit,
   wherein the first electronic unit comprises a first fixing device, and the second electronic unit comprises a second fixing device, the connection assembly connects the first fixing device to the second fixing device to splice the first electronic unit and the second electronic unit,
   wherein the connection assembly comprises a connection plate, a first fastener and a second fastener, the connection plate has a plurality of fixing holes, the first fixing device has a first fixing hole, and the second fixing device has a second fixing hole, the first fastener passes through one of the plurality of fixing holes and the first fixing hole to secure the connection plate and the first fixing device, and the second fastener passes through another of the plurality of fixing holes and the second fixing hole to secure the connection plate and the second fixing device.

2. The electronic device as claimed in claim 1, wherein the first light-emitting device comprises a light-emitting plate and a back plate, and the adjustment device is connected to the back plate.

3. The electronic device as claimed in claim 2, wherein the back plate comprises a control board, at least one printed circuit board and a plurality of circuits, the control board is electrically connected to the at least one printed circuit board via the plurality of circuits.

4. The electronic device as claimed in claim 1, wherein the adjustment device comprises an angle adjustment unit to change an angle between the first light-emitting device and the suspension device.

5. The electronic device as claimed in claim 4, the electronic device further comprising a second-light emitting device disposed adjacent to the first light-emitting device, wherein the second light-emitting device and the first light-emitting device are arranged in a first direction, the adjustment device further comprises a position adjustment unit to change a height difference between the first light-emitting device and the second light-emitting device.

6. The electronic device as claimed in claim 1, wherein the suspension device comprises at least one steel rope.

7. The electronic device as claimed in claim 1, wherein a first fixing direction of the first fastener is perpendicular to a second fixing direction of the second fastener.

8. The electronic device as claimed in claim 1, wherein the first fixing device comprises a first portion and a second portion perpendicular to the first portion, the second fixing device comprises a pair of third portions parallel to each other, a fourth portion connected to the pair of third portions and parallel to the second portion and an adjustment element, the connection assembly further comprises an abutting portion disposed between the second portion of the first fixing device and the fourth portion of the second fixing device, and the adjustment element passes through the fourth portion to adjust a distance between the fourth portion and the abutting portion.

9. The electronic device as claimed in claim 1, further comprising:
   a turn bracket disposed on the suspension device, the turn bracket comprising a first plate, a first extension portion connecting the first plate, a second plate, a second extension portion connecting the second plate, a first screw knob and a second screw knob, wherein the first plate is superimposed on the second plate, the first plate has a first groove, the second plate has a second groove, an extension direction of the first extension portion is different from an extension direction of the second extension portion, the first screw knob and the second screw knob are slid into the first groove and the second groove respectively.

10. The electronic device as claimed in claim 9, wherein the first extension portion and the second extension portion have a plurality of fixing slots respectively, and the suspension device passes between the first plate and the second plate and is limited to at least one of the plurality of fixing slots.

11. The electronic device as claimed in claim 1, wherein the at least one electronic unit comprises a plurality of electronic units spliced together and arranged in an arc or V-shape.

12. An electronic device, comprising:
   at least one electronic unit, each of the at least one electronic unit comprising:
      a first light-emitting device;
      an adjustment device connected to the first light-emitting device for adjusting a position state of the first light-emitting device; and
      a suspension device connected to the adjustment device,
   wherein the at least one electronic unit comprises a first electronic unit and a second electronic unit disposed adjacent to the first electronic unit, and the electronic device further comprises:
   a connection assembly connecting the first electronic unit to the second electronic unit,
   wherein the first electronic unit comprises a first fixing device, and the second electronic unit comprises a second fixing device, the connection assembly connects the first fixing device to the second fixing device to splice the first electronic unit and the second electronic unit,
   wherein the connection assembly comprises a first connection plate, a second connection plate, a third connection plate, a first fastener and a second fastener, the first connection plate comprises a first connection portion and a second connection portion perpendicular to the first connection portion, the second connection plate comprises a third connection portion and a fourth connection portion perpendicular to the third connection portion, the third connection plate comprises a fifth connection portion and a sixth connection portion perpendicular to the fifth connection portion, the second connection portion is fixed to the fourth connection portion, the sixth connection portion is fixed to the fourth connection portion, the first fastener passes through the first fixing device to secure to the first connection portion of the first connection plate, and the second fastener passes through the third connection portion of the second connection plate to secure to the second fixing device.

13. The electronic device as claimed in claim 12, further comprising:

a turn bracket disposed on the suspension device, the turn bracket comprising a first plate, a first extension portion connecting the first plate, a second plate, a second extension portion connecting the second plate, a first screw knob and a second screw knob, wherein the first plate is superimposed on the second plate, the first plate has a first groove, the second plate has a second groove, an extension direction of the first extension portion is different from an extension direction of the second extension portion, the first screw knob and the second screw knob are slid into the first groove and the second groove respectively.

14. The electronic device as claimed in claim 13, wherein the first extension portion and the second extension portion have a plurality of fixing slots respectively, and the suspension device passes between the first plate and the second plate and is limited to at least one of the plurality of fixing slots.

15. The electronic device as claimed in claim 12, wherein a first fixing direction of the first fastener is parallel to a second fixing direction of the second fastener.

16. The electronic device as claimed in claim 12, wherein the first fixing device comprises a first portion and a second portion perpendicular to the first portion, the second fixing device comprises a pair of third portions parallel to each other, a fourth portion connected to the pair of third portions and a first abutting portion disposed between the pair of third portions, the connection assembly further comprises a second abutting portion disposed on the first connection portion of the first connection plate, a first adjustment element and a second adjustment element, the first adjustment element passes through the first abutting portion and the fourth portion of the second fixing device, and the second adjustment element passes through the fifth connection portion of the third connection plate.

* * * * *